| United States Patent [19] | [11] Patent Number: 4,709,261 |
| Spencer | [45] Date of Patent: Nov. 24, 1987 |

[54] COLOR IMAGE DISPLAY SYSTEM FOR PRODUCING AND COMBINING TWO SIMILARLY-ORIENTED COLOR COMPONENT IMAGES AND AN INVERTED COLOR COMPONENT IMAGE

[75] Inventor: Gordon R. Spencer, Westwood, Mass.

[73] Assignee: Raytheon Company, Lexington, Mass.

[21] Appl. No.: 557,981

[22] Filed: Dec. 5, 1983

[51] Int. Cl.⁴ .................. H04N 9/22; H04N 9/16; H04N 9/31

[52] U.S. Cl. ..................................... 358/66; 358/60; 358/64

[58] Field of Search ................... 358/49, 65, 66, 64, 358/60; 352/67; 353/34

[56] References Cited

U.S. PATENT DOCUMENTS

| 2,083,203 | 6/1937 | Schlesinger | 358/60 |
| 2,200,285 | 5/1940 | Lorenzen | 358/66 |
| 2,337,980 | 12/1943 | Du Mont et al. | 358/66 |
| 2,552,464 | 5/1951 | Siezen | 358/66 |
| 2,586,558 | 2/1952 | Oakhill | 358/60 |
| 2,677,722 | 5/1954 | Bedford | 358/60 |
| 2,965,706 | 12/1960 | Ridgeway | 358/60 |
| 3,006,989 | 10/1961 | Schröter | 358/65 |
| 3,202,039 | 8/1965 | De Lang et al. | 358/55 |
| 3,280,254 | 10/1966 | Marez | 358/66 |
| 3,291,906 | 12/1966 | Ward et al. | 358/250 |
| 3,668,304 | 6/1972 | Eilenberger | 358/49 |
| 3,711,826 | 1/1973 | La Russa | 358/250 |
| 3,778,548 | 12/1973 | Nistri | 358/250 |
| 3,885,095 | 5/1975 | Wolfson et al. | 358/250 |
| 4,027,328 | 5/1977 | Lessman | 358/64 |
| 4,167,113 | 9/1979 | Mann | 358/250 |
| 4,249,205 | 2/1981 | Buchroeder | 358/60 |
| 4,301,467 | 11/1981 | Jaeger | 358/49 |
| 4,301,468 | 11/1981 | Alvarez | 358/66 |
| 4,368,950 | 1/1983 | Sakamoto | 350/174 |
| 4,400,722 | 8/1983 | Miyatake et al. | 358/60 |
| 4,431,258 | 2/1984 | Fye | 350/174 |
| 4,473,840 | 9/1984 | Miyatake | 358/60 |

FOREIGN PATENT DOCUMENTS

| 0039619 | 11/1981 | European Pat. Off. . |
| 0056307 | 7/1982 | European Pat. Off. . |
| 3305314 | 9/1983 | Fed. Rep. of Germany . |
| 551357 | 4/1923 | France . |
| 762225 | 4/1934 | France . |
| 967439 | 11/1950 | France . |
| 1417975 | 10/1965 | France . |
| 160744 | 12/1981 | Japan . |
| 155631 | 9/1983 | Japan . |
| 424743 | 2/1935 | United Kingdom . |
| 562168 | 6/1944 | United Kingdom . |
| 696615 | 9/1953 | United Kingdom . |
| 735745 | 8/1955 | United Kingdom . |
| 856932 | 12/1960 | United Kingdom . |
| 1031327 | 2/1966 | United Kingdom . |
| 2014752 | 8/1979 | United Kingdom . |
| 2029667 | 3/1980 | United Kingdom . |
| 2066499 | 7/1981 | United Kingdom . |
| 2111712 | 7/1983 | United Kingdom . |
| 2118360 | 10/1983 | United Kingdom . |

Primary Examiner—James J. Groody
Assistant Examiner—Randall S. Svihla
Attorney, Agent, or Firm—John T. Meaney; Richard M. Sharkansky

[57] ABSTRACT

A multi-color image display system comprising a cathode ray type of tube having a single electron gun disposed for directing a beam of electrons onto an output image display screen provided with three juxtaposed segments of different phosphor materials which emit respective different color light when penetrated by electrons from the beam. The display system also includes a beam directing assembly coupled to the tube for deflecting the electron beam to scan respective raster patterns sequentially on the three segments of the output screen and varying the intensity of the electron beam accordingly to produce thereon respective different color component light images of the same subject matter, the outer images being inverted with respect to one another and the central image being oriented similarly to one of said outer images. Also, the display system includes an optical combiner assembly coupled to the output screen for providing equivalent optical paths for each of said different color component light images within the optical combiner assembly and for combining said different color component light images to display a single multi-color image of said subject matter.

17 Claims, 12 Drawing Figures

COLOR IMAGE DISPLAY SYSTEM FOR PRODUCING AND COMBINING TWO SIMILARLY-ORIENTED COLOR COMPONENT IMAGES AND AN INVERTED COLOR COMPONENT IMAGE

CROSS-REFERENCE TO RELATED APPLICATIONS

Reference is hereby made to copending U.S. patent application Ser. No. 039,816 filed on Mar. 14, 1987, which is a continuation of Ser. No. 771,162 filed on Aug. 30, 1985, now abandoned, which in turn is a continuation of Ser. No. 350,469 filed on Feb. 19, 1982, now abandoned, as well as to U.S. patent application Ser. No. 946,670 filed on Dec. 31, 1986, which is a continuation of Ser. No. 513,939 filed on July 15, 1983, now abandoned; and applicant claims the benefit of the filing dates of said applications as to claimed common subject matter.

BACKGROUND OF THE INVENTION

1. Field of the Invention

This invention relates generally to image display apparatus and is concerned more particularly with an imaging system for producing three different color component images of the same subject matter and combining the images to display a single multi-color image of said subject matter.

2. Discussion of the Prior Art

A cathode ray type of image display tube generally includes a tubular envelope having therein an electron gun disposed for directing an electron beam in scanning fashion over a portion of an output phosphor screen to produce a visible light image. The phosphor screen may be provided with a suitable phosphor material for emitting a desired color light when penetrated by electrons from the scanning beam. Thus, a plurality of cathode ray tubes may have respective phosphor screens comprised of different phosphor materials for producing respective different color component images of the same subject matter, and be disposed for projecting the different color images into superposition with one another on a projection screen. As a result, there will be displayed on the projection screen a single multi-color image having discrete areas colored in accordance with the relative intensities of the different colors in corresponding discrete areas of the respective component images produced by each of the cathode ray tubes.

However, it has been found difficult to provide a plurality of cathode ray tubes with means for producing identical images of the same subject matter, and to maintain the tubes in precise optical alignment so as to obtain color registration in discrete areas of the multi-color image. Consequently, there has been developed in the prior art various types of cathode ray tubes having phosphor screens provided with different phosphor materials for producing a multi-color image. A cathode ray tube of the shadow mask type, for example, has a phosphor screen provided with intermingled arrays of phosphor dots, the dots of each array comprising a different phosphor material for emitting a respective color light when penetrated by electrons from an associated beam passing through aligned apertures in a shadow mask. A cathode ray tube of the beam-indexing type, for another example, has a phosphor screen provided with intermingled arrays of phosphor stripes, the stripes of each array comprising a different phosphor material for localized emission of a respective color light when penetrated by electrons from a suitably indexed electron beam. A cathode ray tube of the voltage penetration type, for a third example, has a phosphor screen provided with superimposed layers of different phosphor material, the material of each layer being activated for localized emission of a respective color light when penetrated by electrons of an associated energy level in a scanning electron beam.

Thus, cathode ray tubes of the described types have phosphor screens requiring complex deposition techniques or special phosphor materials during fabrication, which increases the cost of producing these prior art tubes.

SUMMARY OF THE INVENTION

Accordingly, these and other disadvantages of the prior art are overcome by this invention providing a multi-color image display system with a cathode ray type of display tube having a tubular envelope wherein a single electron gun is disposed for directing an axially emerging electron beam onto an output imaging screen made of light emitting phosphor material. The output imaging screen is aligned with an adjacent output faceplate portion of the tube envelope made of light transmissive material, and comprises a linear array of three juxtaposed segments of respective different phosphor materials which emit respective different color light from localized regions thereof penetrated by electrons from the beam. A central one of said segments is centered substantially on the axial centerline of the tube, and is disposed between two outer segments which are located in substantially equal spaced relationship with the axial centerline of the tube.

The image display system of this invention also comprises beam directing means including electrical circuitry coupled to the tube for producing on the three segments of the output screen respective different color component images, one of which is inverted with respect to the other two images. The electrical circuitry includes beam deflection means for deflecting the axially emerging electron beam angularly with respect to the centerline of the tube, and causing the electron beam to scan respective raster patterns on said three segments of the output screen. The raster pattern on one of said outer segments is scanned in inverse fashion relative to the respective raster patterns scanned on said central segment and the other one of said outer segments of the output screen. Also, the electrical circuitry includes instantaneous beam intensity varying means for instantaneously varying the intensity of the electron beam while scanning each of the raster patterns to produce on the three segments of the output screen respective different color component images of the same subject matter. The color component image produced on said one of the outer segments scanned in inverse fashion is inverted with respect to the other color component images produced on the other two segments of the output screen. Furthermore, the electrical circuitry may include automatic beam intensity adjustment means for automatically adjusting the intensity of the electron beam in accordance with the particular segments of the output screen being scanned to enhance the intensity of the associated color image relative to the respective intensities of the other two color images.

In addition, this image display system comprises light directing means including an optical combiner assembly disposed externally of the tube envelope and coupled to the output screen through the light transmissive, output faceplate of the tube. The optical combiner assembly comprises an aligned series of optical devices, such as mirrors, dichroic filters and beamsplitters, for example, which are arranged for directing light from each of the three color component images produced on the output screen along respective optical paths of substantially equal lengths whereby resulting images are produced in a common plane. Also, the optical devices of the combiner assembly are arranged such that the light from said inverted component image produces in the common plane a resulting image oriented similarly to said resulting images produced by light from the other two component images. As a result, the three color component images produced in the common plane are superimposed on one another and appear to the eye of an observer as a single multi-color image. Furthermore, the optical devices of the combiner assembly may be arranged for directing some of said light along portions of said optical paths and back along the same portions of said optical paths. Moreover, the optical devices of said combiner assembly may include means for recovering some of said light that would otherwise be lost to the system, and means for deliberately eliminating some of said light from the system.

BRIEF DESCRIPTION OF THE DRAWINGS

For a more complete understanding of the invention, reference is made in the following detailed description to the accompanying drawings wherein.

DESCRIPTION OF THE PREFERRED EMBODIMENTS

Figure 1:
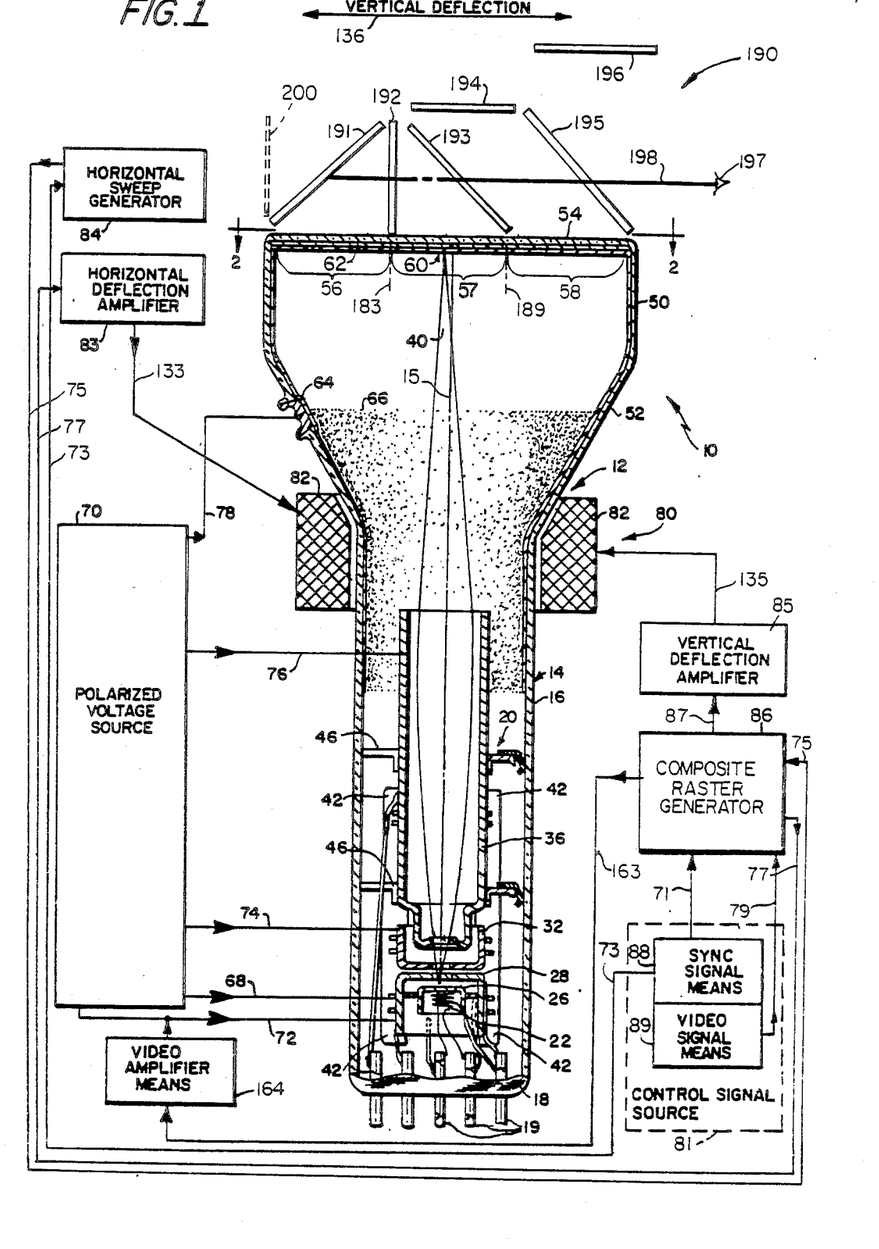
FIG. 1 is an axial sectional and schematic view of multi-color image display apparatus embodying the invention.

Referring to the drawings wherein like characters of reference designate like parts, there is shown in FIG. 1 a multi-color image display system 10 comprising a cathode ray type of tube 12. The tube 12 is provided with a funnel-shaped envelope 14 made of suitable dielectric material, such as glass, for example, and has an axial centerline 15 which extends into a neck-end portion 16 of envelope 14. Neck-end portion 16 terminates at one end of envelope 14 in a peripherally sealed stem press 18 through which a circular array of spaced terminal pins 19 extends hermetically. The terminal pins 19 provide means for supporting and making electrical connections to respective elements of an electron gun 20 which is disposed axially within the neck-end portion 16.

The electron gun 20 includes a filamentary heater 22 axially disposed adjacent the stem press 18 and within an inverted cathode cup 26 which has a closed end provided with an outer coating (not shown) of heat sensitive, electron emitting material. Cathode cup 26 is axially disposed in spaced relationship within an inverted first grid cup 28 which has a centrally apertured, closed end aligned with the adjacent closed end of cathode cup 26. The closed end of inverted first grid cup 28 is disposed in close juxtaposed relationship with a centrally apertured, closed end of an upright second grid cup 32. Extending in spaced relationship within the opposing open end of second grid cup 32 is a centrally apertured, closed end of an elongated focussing cup 36.

The opposing open end of focussing cup 36 constitutes the exit end portion of gun 20 from which an electron beam 40 is directed axially toward the opposing end portion of envelope 14. The respective beam-forming electrodes 28, 32 and 36 of gun 20 are insulatingly attached to one another, as a sub-assembly, for example, by being fixedly secured to a plurality of axially extending dielectric rods 42 which are angularly spaced apart about the gun 20. Also, the sub-assembly of respective beam-forming electrodes 28, 32 and 36 may be held substantially on the axial centerline 15 by means of a plurality of axially spaced collars 46 which encircle electrodes of the gun 20 and press against the inner surface of neck-end portion 16.

The neck-end portion 16 is integrally joined to an opposing larger diameter end portion 50 of envelope 14 through an interposed outwardly flared portion 52 thereof. Larger diameter end portion 50 terminates in a peripherally sealed faceplate 54 which is substantially perpendicular to axial centerline 15 of tube 12 and is made of transparent material, such as glass, for example. Deposited by conventional means on the inner surface of faceplate 54 is an output phosphor screen 60 comprising three juxtaposed segments, 56, 57 and 58, respectively, the segment 57 being centered about the axial centerline 15 of tube 12 and disposed centrally between the two outer segments 56 and 58, respectively. The outer segment 56 may be made of a phosphor material, such as europium activated yttrium oxide, for example, which emits red light locally when penetrated by electrons of the beam 40. The central segment 57 may be made of a different phosphor material, such as manganese activated zinc silicate, for example, which emits green light locally when penetrated by electrons of the beam 40. Also, the other outer segment 58 may be made of still another phosphor material, such as silver activated zinc sulfide, for example, which emits blue light locally when penetrated by electrons of the beam 40.

Thus, the respective segments 56, 57 and 58 of phosphor screen 60 may comprise a linear array and may be disposed in substantially coplanar relationship with one another. The central segment 57 may have opposing side edges adjoining respective adjacent side edges of the outer segments 56 and 58 along substantially perpendicular planes denoted by the lines 183 and 189, respectively. Alternatively, the respective segments 56, 57 and 58 may be spaced laterally apart in the plane of phosphor screen 60.

Disposed on the inner surface of phosphor screen 60 is an anode coating 62 of electrically conductive material, such as aluminum, for example, which reflects visible light. The coating 62 extends not only over the entire inner surface of larger diameter end portion 50 but also extends axially as well as annularly into the flared portion 52 of the envelope 12. Anode coating 62 is electrically connected to an anode terminal button 64 extending hermetically through the wall of flared portion 52 for the purpose of making an electrical connection to the anode electrode of tube 12.

The anode terminal button 64 and the anode coating 62 are electrically connected to another anode coating 66 which extends from the button 64 toward the neck-end portion 16 of envelope 14. Coating 66 is made of suitable electrically conductive material, such as carbon, for example, which extends axially and annularly along the sloped inner surface of flared portion 52 and into the neck-end portion 16. Within neck-end portion 16, the anode coating 66 terminates in spaced encircling relationship with the exit end portion of gun 20 from which emerges the axially directed electron beam 40. Thus the respective anode coatings 66 and 62 form a generally inverted cup-shaped anode electrode which has established therein a substantially field-free space.

In operation, as shown schematically in FIG. 1, the cathode 26 of gun 20 may be electrically connected through a conductor 68 to a cathode voltage terminal of a polarized voltage source 70. The control grid electrode 28 of gun 20 may be connected electrically through a conductor 72 to a voltage terminal of source 70 which is electrically negative with respect to the cathode voltage terminal for the purpose of controlling the flow of electrons in the beam 40. The second grid electrode 32 of gun 20 may be connected electrically through a respective conductor 74 to an associated voltage terminal of source 70 which is more positive relative to the cathode voltage terminal; and the focussing electrode 36 of gun 20 may be connected electrically through a respective conductor 76 to an associated voltage terminal of source 70 which is still more positive with respect to the cathode voltage terminal of source 70. The anode terminal button 64 may be connected electrically through a conductor 78 to an anode voltage terminal of source 70 which is highly positive electrically with respect to the cathode voltage terminal of source 70. Thus, the respective beam forming electrodes 28, 32, 36 of gun 20 and the cup-shaped anode electrode of tube 12 are maintained at suitable electrical potentials relative to the potential of cathode 26 to focus the electrons of beam 40 onto a small spot area of phosphor screen 60 for producing a localized emission of visible light from the penetrated phosphor material.

A beam directing assembly 80 includes beam coupling means comprising an electromagnetic yoke 82 which encircles the outer surface of neck-end portion 16, adjacent the flared portion 52 of envelope 14, such that the electron beam 40 exiting from gun 20 passes throuoh yoke 82. The yoke 82 comprises a beam deflection means including an opposing pair of interconnected vertical deflection coils (not shown) which are energized for deflecting the electron beam 40 in the vertical direction denoted by vertical vector line 136. The vertical deflection coils of yoke 82 are electrically connected through a conductor 135 to a conventional vertical deflection amplifier 85 which receives signals through a conductor 87 from a composite raster generator 86. Composite raster generator 86 receives drive signals through a conductor 71 from a conventional sync signal means 88 comprising one component of a control signal source 81.

Yoke 82 also includes an opposing pair of interconnected horizontal deflection coils (not shown) which are energized for deflecting the electron beam 40 in a horizontal direction or substantially perpendicular to the direction of vertical vector line 136. The horizontal deflection coils of yoke 82 are electrically connected through a conductor 133 to a conventional horizontal deflection amplifier 83 which receives signals through a conductor 77 from the composite raster generator 86. Composite raster generator 86 receives signals through a conductor 75 from a conventional horizontal sweep generator 84 which receives drive signals through a conductor 73 from the sync signal means 88 of control signal source 81. The composite raster generator 86 also receives signals through an electrical conductor 79 from a conventional video signal means 89 which comprises another component of control signal source 81. The composite raster generator 86 feeds output signals through an electrical conductor 163 to a video amplifier means 164, which is connected to send corresponding signals through the conductor 72 to the control grid electrode 28 of tube 12.

Figure 4:
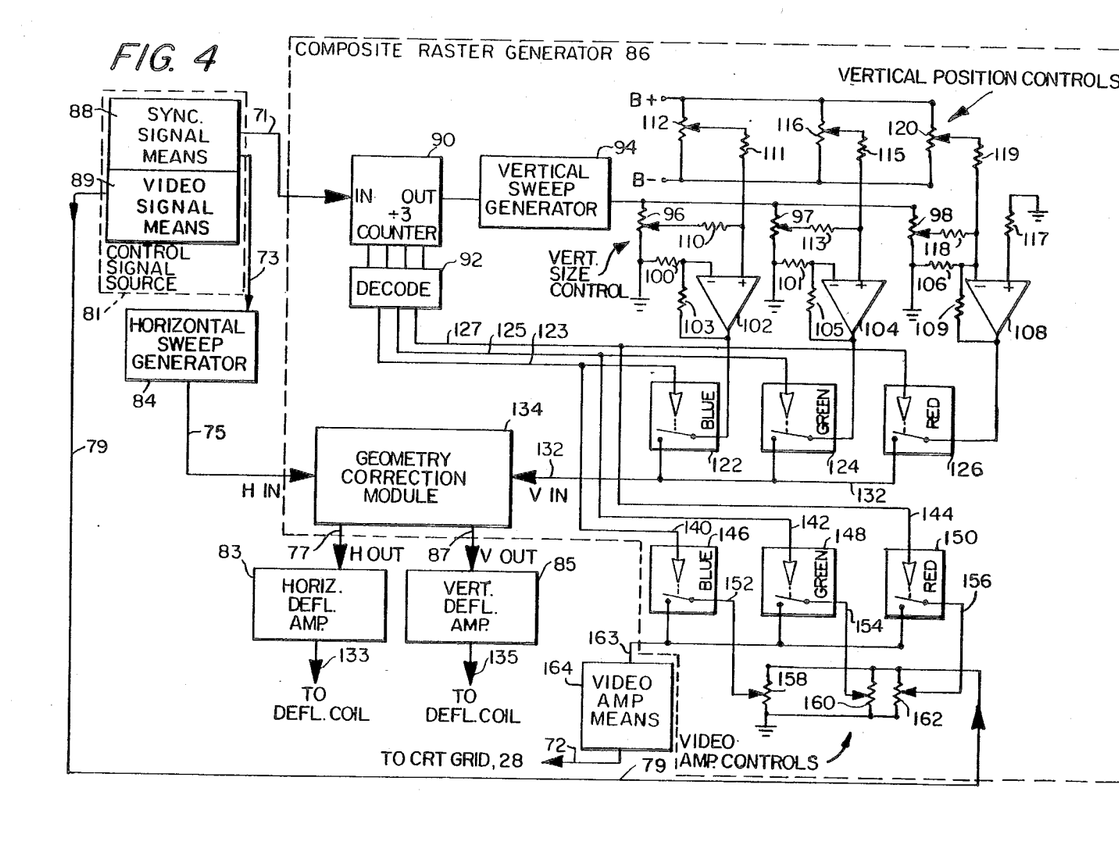
FIG. 4 is a schematic view of a scanning circuit having inverter scanning means for embodiment in the composite raster generator shown in FIG. 1.
Figure 5A:
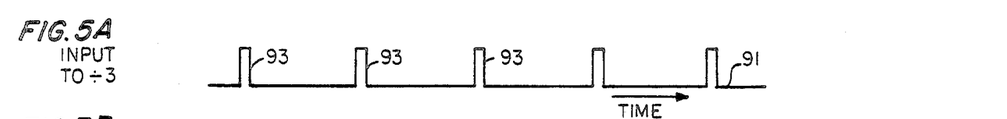
FIGS. 5A–5D are diagrammatic views of electrical signal waveforms generated when using the circuit shown in FIG. 4.

As shown in FIG. 4, within the composite raster generator 86 the output of sync signal means 88 is connected electrically through conductor 71 to an input terminal of a conventional divide-by-three counter 90. As a result, there is applied to the input of counter 90 a clock-like drive signal which, as shown in FIG. 5A, may be represented by a waveform 91 having substantially uniform pulses 93 regularly spaced apart, that is occurring in substantially equal periods of time. The repetition rate or frequency of the pulses 93 is about three times that of the desired vertical scan rate for output screen 60. Counter 90 has a plurality of output terminals connected to a conventional decoder device 92, and an output terminal connected to an input of a vertical sweep generator 94 of the conventional type.

Figure 5B:
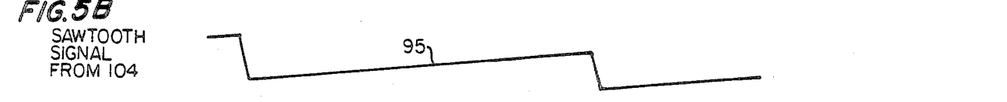

Vertical sweep generator 94 applies to its output terminal a vertical scan voltage signal which, as shown in FIG. 5B, may be represented by a sawtooth waveform 95 having a period substantially equal to three periods of the waveform 91 shown in FIG. 5A. The output of vertical sweep generator 94 is connected to electrical ground through three parallel resistive elements of respective potentiometers 96, 97 and 98 which control the vertical size of areas scanned by electron beam 40 on segments 58, 57 and 56, respectively, of output screen 60.

Potentiometer 96 has the grounded end of its resistive element connected through a resistor 100 to an inverting (−) input terminal of an amplifier 102 which is connected through another resistor 103 to the output of amplifier 102. Similarly, potentiometer 97 has the grounded end of its resistive element connected through a resistor 101 to an inverting (−) input terminal of an amplifier 104 which is connected through another resistor 105 to the output of amplifier 104. Also, the potentiometer 98 has the grounded end of its resistive element connected through a resistor 106 to an inverting (−) input terminal of an amplifier 108 which is connected through another resistor 109 to the output of amplifier 108.

Amplifier 102 has its non-inverting (+) input terminal connected through a resistor 110 to the wiper arm of vertical size control potentiometer 96 and through a resistor 111 to a wiper arm of a vertical position control potentiometer 112. Similarly, amplifier 104 has its non-inverting (+) input terminal connected through a resistor 113 to the wiper arm of vertical size control potentiometer 97 and through a resistor 115 to a wiper arm of a vertical position control potentiometer 116. However, unlike the respective amplifiers 102 and 104, amplifier 108 has its non-inverting (+) input terminal connected through a resistor 117 to electrical ground. The inverting (−) input terminal of amplifier 108 is connected through a resistor 118 to the wiper arm of vertical size control potentiometer 98 and through a resistor 119 to the wiper arm of a vertical position control potentiometer 120. The same value of polarized voltage may be applied across the resistive elements of vertical position control potentiometers 112, 116 and 120, respectively, or different values of polarized voltages may be applied across each of the resistive elements, as desired. The potentiometers 112, 116 and 120 provide means for positioning the respective color images produced on the associated segments 58, 57 and 56 of output screen 60 so that they may be optically superimposed on one another to display a single multi-color image.

Thus, the amplifiers 102 and 104 are connected for producing at their output terminals respective voltage signals having the same polarity as the combined voltage input signals received at their non-inverting (+) input terminals from the associated combination of vertical size and position control potentiometers 96, 112 and 97, 116, respectively. On the other hand, the amplifier 108 is connected for producing at its output terminal a voltage signal having the inverse polarity of the combined input signals received at its inverting (−) input terminal from the associated combination of vertical size and position control potentiometers, 98 and 120, respectively.

The output terminals of amplifiers 102, 104 and 108 are connected electrically to movable arm contact elements of respective switch devices 122, 124 and 126 which have their switch actuating elements connected through respective conductors 123, 125 and 127 to respective output terminals of the decoder device 92. When the decoder device 92 applies an energizing voltage signal to any of the conductors 123, 125 and 127 the connected actuating element is energized to open the associated switch device, as by maintaining the movable arm contact element mechanically out of electrical engagement with the stationary contact element thereof, for example. Conversely, when the decoder device 92 removes the energizing voltage signal from any of the conductors 123, 125 and 127 the connected actuating element is de-energized to close the associated switch device, as by permitting the movable arm contact element to move into electrical engagement with the stationary contact element thereof, for example.

Figure 5C:
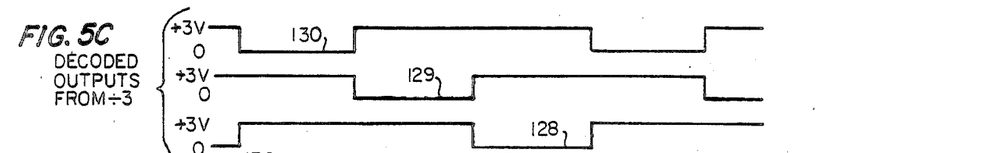

Consequently, as shown in FIG. 5C, the decoder device 92 may apply to the output conductors 123, 125 and 127 respective voltage signals represented by the waveforms 128, 129 and 130, respectively. By comparing the waveform 91 shown in FIG. 5A with the waveforms 128, 129 and 130 shown in FIG. 5C, it may be seen that when the decoder device 92 receives an input pulse 93 it removes the energizing signal from output conductor 127 for one period of the waveform 91, while maintaining the energizing signals on output conductors 125 and 123, respectively. As a result, the movable arm contact element of switch device 126 moves into electrical engagement with the stationary contact element thereof and connects the output terminal of amplifier 108 to the output terminal of switch device 126. During this one period of the waveform 91, as shown by waveforms 129 and 130, respectively, the decoder device continues to apply to conductors 125 and 123 respective energizing voltage signals for holding the movable arm contact elements of switch devices 124 and 122, respectively, out of electrical engagement with the respective stationary contact elements thereof.

However, at the completion of this first period, the decoder device 92 receives another input pulse 93 and removes the energizing voltage signal from output conductor 125 while applying energizing voltage signals to output conductors 127 and 123, respectively. As a result, the amplifier 108 is disconnected from the output terminal of switch device 126 and the amplifier 104 is connected sequentially to the output terminal of switch device 124. Similarly, at the completion of this second period, the decoder device 92 receives another input pulse 93 and removes the energizing voltage signal from output conductor 123 while applying energizing voltage signals to the output conductors 127 and 125, respectively. Consequently, the amplifier 104 is disconnected from the output terminal of switch device 124 and the amplifier 102 is connected sequentially to the output terminal of switch device 102. At the completion of this third period of waveform 91, another input pulse 93 is received by the decoder device 92 and continues the repetitive sequential connecting of amplifiers 108, 104 and 102 to the output terminals of switch devices 126, 124 and 122, respectively. The output terminals of switch devices 126, 124 and 122 are connected, in common, to an electrical conductor 132.

Figure 5D:
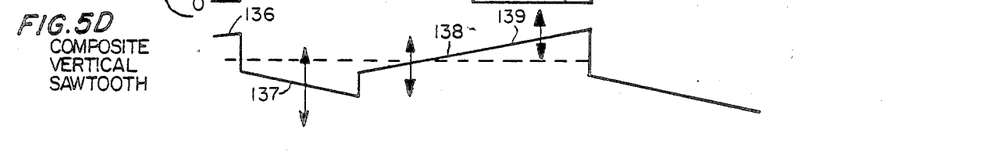

Accordingly, there is applied to the conductor 132 a composite voltage signal which, as shown in FIG. 5D, may be represented by the waveform 136. A comparison of waveform 136 in FIG. 5D with the waveform 95 in FIG. 5B shows that one period of the waveform 136 is approximately equal to one period of the waveform 95 which represents one vertical scan of the entire output screen 60. However, a comparison of the waveform 136 in FIG. 5D with the waveforms 128, 129 and 130 shown in FIG. 5C shows that during one period of the waveform 136 there is a negative sloped portion 137 corresponding to the interval when the energizing voltage signal is removed from conductor 127 and only amplifier 108 is connected, through switch device 126, to output conductor 132. The portion 137 is followed by an abrupt rise in the positive direction and the start of a positive sloped portion 138 corresponding to the interval when the energizing voltage signal is removed from conductor 125 and only amplifier 104 is connected, through switch device 124, to output conductor 132. Portion 138 is followed by a similar positive sloped portion 139 which looks like a continuation of portion 138 and corresponds to the interval when the energizing voltage signal is removed from conductor 123 and only amplifier 102 is connected, through switch device 122, to the output conductor 132. Portion 139 is followed by an abrupt drop in the negative direction and the start of another period occurring cyclically in the waveform 136 when the respective amplifiers 108, 104 and 102 are connected sequentially to the conductor 132.

Since output screen 60 is deposited on the substantially flat output faceplate 54 and is scanned by the electron beam 40 being deflected electromagnetically, it is necessary to incorporate corrections for scan nonlinearity and raster pattern distortion in the three color images produced on respective segments 56, 57 and 58 of output screen 60. Otherwise, the scanned raster area of the central segment 57 will appear smaller than the scanned raster areas of respective outer segments 56 and 58. Also, the respective color images produced on the scanned raster areas of outer segments 56 and 58 will exhibit more severe pincushion distortion than the color image produced on the scanned raster area of central segment 57. Consequently, if the three color images are to be superimposed on one another to produce a single multi-color image, it is necessary to generate picture increments on the three segments 56, 57 and 58 of output screen 60 in the correct relative positions for superposition of the resulting color images to be achieved without great difficulty.

Accordingly, the conductor 132 may be connected to an input terminal of a geometry correction module 134 which has another input terminal connected through the conductor 75 to the output of horizontal sweep generator 84. Geometry correction module 134 also has respective output terminals connected through respective conductors 77 and 87 to the horizontal deflection amplifier 83 and the vertical deflection amplifier 85, which are connected through respective conductors 133 and 135 to the horizontal and vertical deflection coils of yoke 82, respectively. The geometry correction module 134 may be of the type, such as INTRONICS C104 sold by Intronics of Newton, Mass., for example, used for smoothly synthesizing a correction function which closely approximates an exact mathematical correction function. Thus, the geometry correction module 134 comprises a linearity compensating means which is inserted between the horizontal and vertical deflection amplifiers 83, 85 and the respective signal carrying conductors 75 and 132 for eliminating any pincushion distortion which may occur non-uniformly from image-to-image in the three different color images produced sequentially on respective segments 56, 57 and 58 of output screen 60.

On the other hand, if an alternative beam directing assembly employing electrostatic means for deflecting the electron beam 40 is used, pin-cushion distortion may not be a problem and the geometry correction module 134 may not be required. In that event, the conductor 75 may be connected directly to the horizontal deflection amplifier 83 and the conductor 132 may be connected directly to the vertical a deflection amplifier 85.

The output conductors 123, 125 and 127 connected to respective output terminals of the decoder device 92 also may be connected through respective electrical conductors 140, 142 and 144 to actuating elements of brightness switch devices 146, 148 and 150, respectively. The movable arm contact elements of switch devices 146, 148 and 150 are connected through respective electrical conductors 152, 154 and 156 to respective wiper arms of brightness control potentiometers 158, 160 and 162, respectively. The resistive elements of potentiometers 158, 160 and 162 have respective terminal ends connected, in common, through the conductor 79 to the output of video signal means 89 in control signal source 81 and have respective opposing terminal ends connected, in common, to electrical ground. The stationary contact elements of switch devices 146, 148 and 150 are connected, in common, through an electrical conductor 163 to an input terminal of video amplifier means 164 which is connected through conductor 72 to the control grid 28 of tube 12.

Thus, when the switch device 126 is closed to connect the output of amplifier 108 through conductor 132 and geometry correction module 134 to the vertical deflection coils of yoke 82, the switch device 150 closes simultaneously to connect the wiper arm of potentiometer 162 through conductor 163 and video amplifier means 164 to control grid 28 of electron gun 20 in tube 12. Consequently, while the yoke 82 is deflecting the electron beam 40 for scanning a raster pattern on the segment 56 of output screen 60, the setting of potentiometer 162 determines the potential of control grid 28 for adjusting the intensity of the scanning electron beam 40 to provide the desired brightness of red light emitted locally from the phosphor material of segment 56. Similarly, when the switch device 124 closes to energize the vertical deflection coils of yoke 82 for scanning the segment 57 of output screen 60, the switch device 148 closes simultaneously so that the adjustment of potentiometer 160 determines the brightness of green light emitted locally from the phosphor material of segment 57. Also, when the switch device 122 closes to energize the vertical deflection coils of yoke 82 for scanning the segment 58 of output screen 60, the switch device 146 closes simultaneously so that the adjustment of potentiometer 158 determines the brightness of blue light emitted locally from the phosphor material of segment 58.

Figure 2:
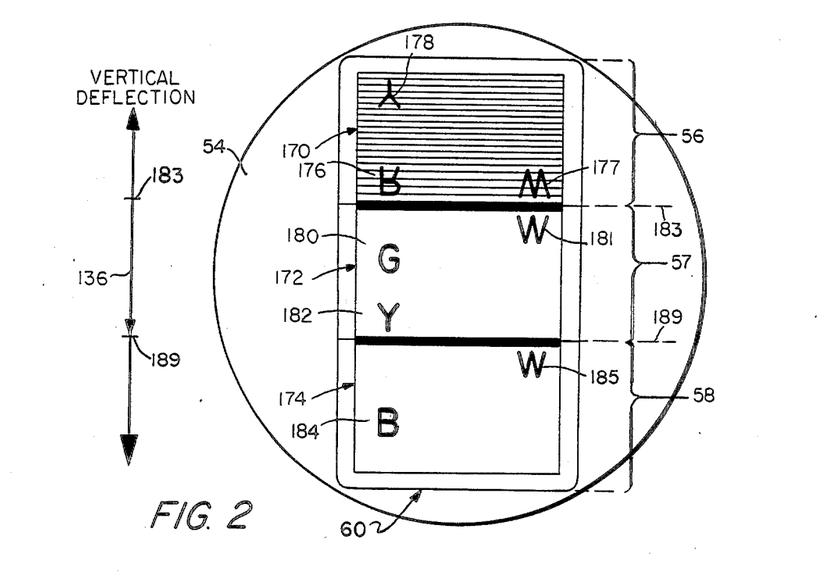
FIG. 2 is a plan view of the output end portion of the tube shown in FIG. 1 as taken along the line 2—2 and looking in the direction of the arrows, but rotated ninety degrees for purposes of clarity.

Consequently, as shown in FIG. 2, there is produced on the segment 56 of output screen 60 a red colored raster area 170, on the segment 57 a green colored raster area 172, and on the segment 58 a blue colored raster area 174. As well-known in the art, the electron beam 40 scanning a particular raster area may have its instantaneous intensity vary in accordance with corresponding variations in an input video signal which is applied to control grid 28 from the video signal means 89 in control signal source 81. As a result, there may be produced on the red raster area 170 an alphanumeric character 176 representing an entirely red R portion of an overall scene for display, an alphanumeric character 178 representing a red component of a yellow Y portion in the overall scene, and an alphanumeric character 177 representing a red component of a white W portion in the overall scene. Similarly, there may be produced on the green raster area 172, a character 180 representing an entirely green G portion of the overall scene, a character 182 representing the green component of the yellow Y portion of the scene, and a character 181 representing the green component of the white W portion of the scene. Also, there may be produced on the blue raster area 174, a character 184 representing an entirely blue B portion of the overall scene, and a character 185 representing the blue component of the white W portion of the overall scene.

While referring to FIG. 2 and FIG. 4, it should be noted that the input video signal from video signal means 89 in control signal source 81 is fed through the respective wiper arms of potentiometers 162, 160 and 158 and the respective movable arm contact elements of switch devices 150, 148 and 146 to the video amplifier means 164 from which it is applied through conductor 72 to the control grid 28. Consequently, instantaneous variations in the input video signal cause corresponding instantaneous variations in the intensity of electron beam 40 for producing informational data when scanning the respective raster areas 170, 172 and 174. However, the overall brightness of each of the raster areas 170, 172 and 174 is controlled by the adjustments of the potentiometers 162, 160 and 158, respectively.

Also, note that, as compared to the amplifiers 102 and 104, the amplifier 108 has its inverting (−) input terminal connected through the wiper arm of vertical size control potentiometer 98 to the output of vertical sweep generator 94. As a result, the red raster area 170 is scanned in an inverse manner, that is from plane 183 toward the adjacent end of output screen 60, as compared to the direction of scanning the respective green and blue raster areas 172 and 174, that is from plane 183 toward the other end of output screen 60. Consequently, the alphanumeric characters, such as 176, for example, in raster area 170 are inverted relative to the alphanumeric characters, such as 180 and 184, for example, in raster areas 172 and 174, respectively; and a commonly shared alphanumeric character, such as 177, for example, in raster area 170 is a mirror image of the similar alphanumeric characters, such as 181 and 185, for example, in raster areas 172 and 174, respectively. Finally, note that by independently adjusting the respective wiper arms of vertical position control potentiometers 120, 116 and 112 the respective roster areas 170, 172 and 174 may be moved vertically relative to one another on the output screen 60.

Referring again to FIG. 1, there is shown disposed externally of display tube 12 and optically coupled through output faceplate 54 to the output screen 60 an optical combiner assembly 190, which is supported by conventional means in a preferred positional relationship with the output screen 60. Assembly 190 includes a mirror 191 aligned with the segment 56 of output screen 60 and disposed at an angle, such as forty-five degrees, for example, with respect to segment 56. The mirror 191 is predominantly reflective to red light, such as emitted from the phosphor material of segment 56, for example. Disposed coplanar with the plane designated as 183 and defining the adjoining edges of segments 56 and 57, respectively, is a dichroic mirror 192 which is oriented substantially perpendicular relative to the respective segments 56 and 57. This second mirror 192 is predominantly transmissive to red light and predominantly reflective to green light, such as emitted from the phosphor material of segment 57, for example.

Aligned with the segment 57 and disposed at an angle, such as forty-five degrees, for example, with respect to segment 57 is a beamsplitter 193 which is predominantly transmissive to red light. Beamsplitter 193 is about fifty percent transmissive and fifty percent reflective to green light and substantially totally reflective to blue light. Also, on the far side of beamsplitter 193 and aligned therewith there may be disposed substantially parallel wfth the segment 57 a green light recovery mirror 194 which is predominantly reflective to green light and substantially non-reflective to blue light.

The beamsplitter 193 and recovery mirror 194 do not extend beyond the plane designated as 189 and defining the adjoining edges of segments 57 and 58, respectively. Aligned with the segment 58 and disposed at an angle, such as forty-five degrees, for example, therewith is a second beamsplitter 195. The beamsplitter 195, which is preferably predominantly transmissive to red and green light, is about fifty percent transmissive and about fifty percent reflective to blue light. Also, on the far side of beamsplitter 195 and aligned therewith, there is disposed substantially parallel with the segment 58 a mirror 196 which is predominantly reflective to blue light. An observer's eye 197 may be disposed beyond the output of optical combiner assembly 190 for viewing on or near the optical axis 198 thereof a combined multicolor image.

Figure 6A:
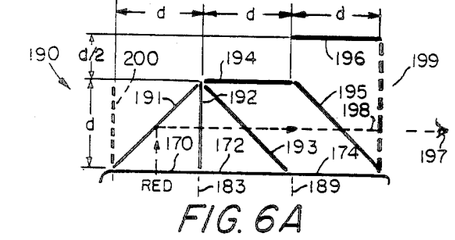
FIGS. 6A–6D are schematic views showing the optical paths travelled by respective red, green, blue light rays from component color images produced at the output portion of the tube shown in FIG. 1.

In operation, as shown in FIG. 6A, the red light from raster area 170 is reflected by the mirror 191 such that the red light image is transmitted upright in the direction of the optical axis 198 to the observer's eye 197. Thus, the red light travels within the optical combiner assembly 190 from the raster area 170 to an exit plane indicated as 199 a total optical path length equivalent to three times a unitary path length "d", which may be defined as the center-to-center distance of adjacent segments 56, 57 and 58, respectively. As a result, the observer's eye 197 sees a virtual image of raster area 170 at the plane identified as 200 which is located an equivalent optical distance of three times "d" from the exit plane 199 of optical combiner assembly 190.

Figure 6B:
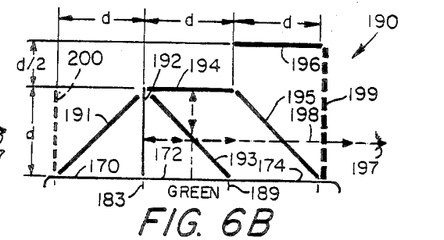

Also, as shown in FIG. 6B, about fifty percent of the green light from raster area 172 is reflected by the beamsplitter 193 toward the mirror 192 where substantially all of this originally reflected component of green light is reflected back to the beamsplitter 193. At beamsplitter 193, about fifty percent of the originally reflected component of green light is reflected by the beamsplitter 193 toward the aligned segment 57. However, the other approximately fifty percent of the originally reflected component of green light is transmitted in the direction of optical axis 198 to the observer's eye 197. Moreover, about fifty percent of the green light from raster area 172 is transmitted through the beamsplitter 193 to the recovery mirror 194 where substantially all of this originally transmitted component of green light is reflected back to the beamsplitter 193. At the beamsplitter 193, about fifty percent of the originally transmitted component of green light is transmitted through the beamsplitter 193 to the aligned segment 57. However, the other approximately fifty percent of the originally transmitted component of green light is reflected from the beamsplitter 193 to travel in the direction of optical axis 198 with the fifty percent of the originally reflected component of green light reflected from the mirror 192 and transmitted through beamsplitter 193. As a result, the reflected component of green light and the transmitted component of green light reaching the observer's eye 197 travel within the optical combiner assembly 190 respective optical path lengths equivalent to three times "d". Consequently, the observer's eye 197 also sees an upright virtual green light image of raster area 172 at the plane identified as 200.

Figure 6C:
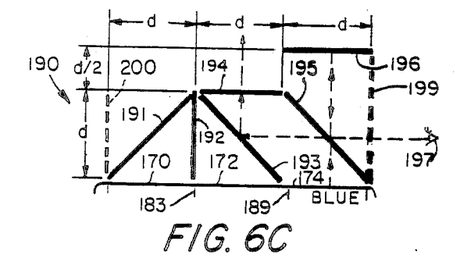

Furthermore, as shown in FIG. 6C, the blue light from raster area 174 is about fifty percent reflected from the beamsplitter 195 to travel in the direction of the optical axis 198 to the beamsplitter 193. At the beamsplitter 193, the originally reflected blue light is reflected in the direction of mirror 194 which is either absorbent or transmissive to blue light such that this originally reflected component of blue light is lost from the system. Also, of the blue light emanating from raster area 174, about fifty percent is transmitted through the beamsplitter 195 and travels to the aligned mirror 196 where it is substantially totally reflected back to the beamsplitter 195. Again at beamsplitter 195, this originally transmitted component of blue light is about fifty percent transmitted through the beamsplitter 195 to the aligned segment 58 and about fifty percent reflected to travel in the direction of optical axis 198 to the observer's eye 197. Consequently, the blue light reaching the eye 197 travels within the optical combiner assembly 190 an optical path length equivalent to three times "d". As a result, the observer's eye 197 sees the blue light image as upright and appearing to emanate from a virtual blue image at the plane identified as 200.

Figure 3:
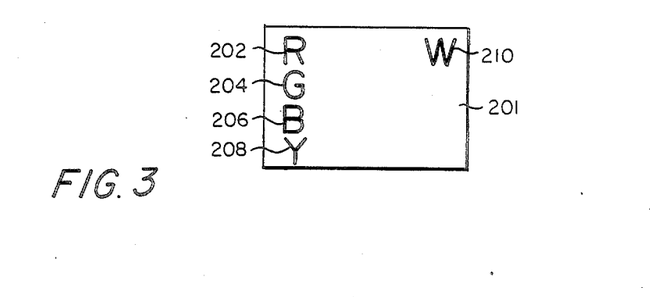
FIG. 3 is an elevation view of the output end portion of the optical combiner assembly shown in FIG. 1, at seen from the position of the observer's eye.
Figure 6D:
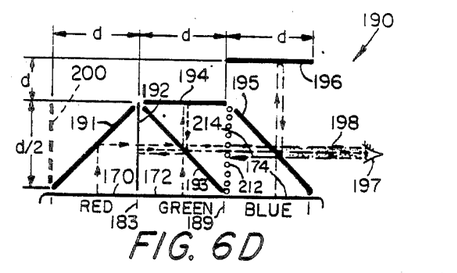

Accordingly, as shown in FIG. 6D, the red, green, and blue light rays emanating from the raster areas 170, 172 and 174 on segments 56, 57 and 58, respectively, travel substantially equal optical path lengths in the optical combiner assembly 190 and appear to be projected in the direction of optical axis 198 from a combined virtual image at the plane 200. Therefore, the observer's eye 197 sees, as shown in FIG. 3, a single multi-color image 201 having an entirely red R character 202, an entirely green G character 204, an entirely blue B character 206, a yellow Y character 208, and a white W character 210. The entirely red R character 202 corresponds to the character 176 in raster area 170; the entirely green G character 204 corresponds to the character 180 in raster area 172; and the entirely blue B character corresponds to the character 184 in raster area 174. On the other hand, the yellow Y character 208 is a combination of the character 178 in raster area 170 and the character 182 in raster area 172. Also, the white W character 210 is a combination of the character 177 in raster area 170, the character 181 in raster area 172, and the character 185 in raster area 174.

Referring again to FIGS. 6C and 6D, it may be seen that the mirror 194 is disposed at a distance equivalent to "d" from raster area 172 and the mirror 196 is disposed at a distance equivalent to "d+d/2" from the raster area 174 so that the respective green and blue light reflected therefrom will produce respective green and blue light images at the . plane 200 located a distance of "3d" from the exit plane 199 of combiner assembly 190. Therefore, the mirror 194 is required to be transmissive or absorbent to blue light so that the originally reflected component of blue light will not be reflected back and form a "ghost" image at a plane spaced from the plane 200. Alternatively, as shown in FIG. 6D, there may be disposed coplanar with the plane 189 a blue light absorbent filter 212 which is transmissive to red and green light. Thus, the originally reflected component of blue light denoted by ray 214, when reflected from beamsplitter 195, will be substantially totally absorbed by the filter 212 and will not reach the beamsplitter 193.

Thus, there has been disclosed herein a multi-color image display system including a cathode ray type of display tube 12 having a single electron gun 20 disposed for directing an electron beam 40 onto a phosphor output screen 60. The output screen 60 comprises a linear array of three juxtaposed segments 56, 57 and 58, respectively, which are made of different phosphor materials for producing different color light images, such as red raster area 170, green raster area 172, and blue raster area 174, respectively, for example. The disclosed display system also includes a beam directing assembly 80 having a composite raster generator 86 provided with means for dividing the time interval allowed for completing one vertical scan of output screen 60 into three substantially equal time periods for scanning respective screen segments 56, 57 and 58 in sequence at a frequency rate suitable for substantially avoiding the sensation of flickering at the observer's eye 197. As a result, the observer's eye 197 sees simultaneously the respective red, green and blue color images, such as the corresponding linear array of raster areas 170, 172 and 174, for example, from which can be generated respective color components of a single multi-color output image.

Composite raster generator 86 is provided with vertical size control means and vertical position control means for adjusting the respective raster areas 170, 172 and 174 independently of one another so that they may be brought into coincidence in the single multicolor output image 201. Also, composite raster generator 86 is provided with means for independently adjusting the brightness of the colors in the raster areas 170, 172 and 174, respectively, to compensate for the differences in energy conversion efficiencies of the respective phosphor materials used for forming the segments 56, 57 and 58 of output screen 60. Moreover, composite raster generator 86 may be provided with linearity compensating means for correcting linearity and pattern distortion which may occur when the electron beam is deflected over portions of a substantially flat faceplate by means of electromagnetic deflection.

The disclosed multi-color image display system also includes an optical combiner assembly for directing the light rays from raster areas 170, 172 and 174, respectively, along equivalent optical paths to the eye of an observer. As a result, the three color images appear to emanate from respective virtual images in a common plane and appear to be superimposed on one another as a single multicolor image. Thus, increments of the final image may be seen in an intermediate color by addressing corresponding increments of two or all three of the respective segments 56, 57 and 58 with the electron beam 40 having its intensity independently adjusted for each of the associated color components so that the brightnesses thereof are in correct proportion for producing the desired additive effect. Also, it should be noted that the disclosed optical combiner assembly is provided with means, such respective recovery mirror 194, for example, for recovering light that would otherwise be lost.

Although the cathode ray type of display tube 12 is shown in FIG. 2 as having a circular faceplate 54, it may equally well be provided with a rectangular output faceplate having a configuration conforming to the combined raster areas 170, 172 and 174 and having a slightly larger surface area. Also, although the beam deflection assembly shown herein is of the raster scanning type, it may equally well be of the stroke-writing type having means for producing the outlines of desired alphanumeric characters, vectors and other line patterns anywhere on each of segments 56, 57 and 58 without scanning an entire segment. Moreover, although the switch devices 122, 124, 126, 146, 148 and 150 shown in FIG. 4 have been described as mechanically operated, such as relay switches, for example, they may equally well be electronically operated, such as DG201 solid state switching devices manufactured by Analog Devices of Norwood, Mass., for example.

Furthermore, in place of the disclosed plate-like mirrors and beamsplitters, the optical combiner assembly 190 may employ appropriately coated surfaces of right-angle prisms. In addition, the optical devices of combiner assembly 190 may be held in place with respect to one another and output faceplate 54 by filling interposed spaces with an optically clear, index-matching cement, such as epoxy resin material used for bonding implosion panels to output faceplates of display tubes, for example, to form a rigid assembly. Moreover, the beamsplitter 193 may be of the improved plate-like type disclosed in copending U.S. patent application Ser. No. 513,939 filed by the present applicant and assigned to the same assignee.

Also, the arrangement of colors may be altered from that illustrated and described. For example, phosphor segments 56, 57, and 58 could be blue, green, and red, respectively, in which case mirror 191 would be blue-reflective, and dichroic filter 192 would be predominantly transmissive to blue as well as being predominantly reflective to green. Also, beamsplitter 193 would be predominantly transmissive to blue, predominantly reflective to red, and about 50% transmissive, 50% reflective to green. In addition, mirror 194 would be predominantly reflective to green and substantially non-reflective to red. Moreover, beamsplitter 195 would be predominantly transmissive to blue and green and about 50% transmissive, 50% reflective to red. Furthermore, mirror 196 would be predominantly reflective to red.

Also, the system described herein would perform essentially as described, although somewhat less efficiently, if the phosphor screen 60 were comprised of a uniform intimate mixture of phosphors emissive in the three colors and if mirror 196 were made to be reflective only for the color to which beamsplitter 195 is about equally transparent and reflective, and if mirror 194 were made to be substantially non-reflective in the same color.

Also, the optical combiner as described herein would function equally well if the single cathode ray tube 12 were replaced by three cathode-ray tubes saving their respective phosphor screens emissive in distinct colors and arranged approximately coplanar in close-spaced juxtaposed relationship. With three separate tubes, each supplied with its own deflection means, the phosphor screens could be simultaneously addressed by the three electron beams, as, for example, in the manner well-known in the art of tri-color flying-spot scanning employed in the television broadcasting industry.

Also, the described system would function satisfactorily if other image-producing means, for example, matrix-addressed light-emitting diodes arrays, were substituted for the cathode-ray tube 12 depicted in FIG. 1.

From the foregoing, it will be apparent that all of the objectives of this invention may be achieved by matter shown and described herein. It also will be apparent, however, that various changes may be made by those skilled in the art without departing from the spirit of the invention as expressed in the appended claims. It is to be understood, therefore, that all matter shown and described herein is to be interpreted as illustrative and not in a limiting sense.

What is claimed is:

1. In combination:
   image producing means including an output phosphor screen, said image producing means producing on said screen a pair of mutually inverted images of a subject and an additional image of said subject, said additional image being disposed between said mutually inverted images and being oriented similarly to one of said mutually inverted images; and
   output optical means coupled to said output phosphor screen for combining said mutually inverted images and said additional image.

2. The combination as set forth in claim 1 wherein each of said images differs in some aspect with respect to the other two images.

3. The combination as set forth in claim 1 wherein each of said images is produced in a different color light as compared to the other two images.

4. The combination as set forth in claim 1 wherein said images are produced in a common plane.

5. The combination as set forth in claim 1 wherein said images are produced in a juxtaposed relationship with one another.

6. The combination as set forth in claim 5 wherein said additional image is centrally disposed between said mutually inverted images.

7. An image display system comprising:
   image producing means including an output phosphor screen, said image producing means producing on said screen three images of a subject in a juxtaposed relationship with one of said images being centrally disposed between the other two of said images, said centrally disposed image being oriented in a similar manner to one of said other two of said images and the other one of said other two of said images being inverted with respect to the similarly oriented images; and
   output optical means coupled to said output phosphor screen for combining all three of said images and forming a single combined image of said subject.

8. An image display system as set forth in claim 7 wherein said output optical means includes means for inverting said inverted one of said three images and directing light rays from all three of said images along respective optical paths having lengths optically equivalent to one another to an output portion of said output optical means.

9. An image display system as set forth in claim 8 wherein said inverting and directing means includes image reflective means disposed at least for reflecting a portion of the light ray from one of said images first in one direction and then in a direction substantially opposite to said one direction.

10. An image display system as set forth in claim 9 wherein said image reflective means includes a beamsplitter disposed for reflecting said portion of said light rays from said one of said images and for transmitting the remaining portion of said light rays from said one of said images.

11. An image display system as set forth in claim 10 wherein said image reflective means further includes a recovery mirror diposed in the path of said transmitted portion of said light rays from said one of said images for reflecting said transmitted portion back to said beamsplitter.

12. An image display system as set forth in claim 8 wherein said inverting and directing means produces said single combined image of said subject as a virtual image in a plane located at an optical distance substantially equal to said optically equivalent lengths of said optical paths from said output portion.

13. An image display system comprising:
    an output screen means including three segments made of respective different phosphor materials for emitting respective different colors of light, a first one of said three segments being disposed between a second one and a third one of said three segments;
    image producing means coupled to said output screen means for exciting emission of said respective different colors of light from said respective different phosphor materials and producing on said segments respective component images of a subject, the image on said first one of said segments being inverted with respect to the image on said second one of said segments and being similarly oriented relative to the image on said third one of said segments; and
    image oombiner means coupled to said output screen means for combining said respective component images and forming a single multi-color image;

wherein said output screen means and at least a portion of said image producing means are part of an image display tube.

14. An image display system as set forth in claim 13 wherein said image producing means includes segment scanning means for scanning said second one of said segments in an inverse manner with a respect to a manner of scanning said first one of said segments.

15. An image display system as set forth in claim 14 wherein said image producing means further includes sequencing means for scanning said segments of the output screen means sequentially.

16. An image display system as set forth in claim 13 wherein said image producing means includes brightness control means for adjusting the brightness of said different colors of light emitted from said different phosphor materials of said first one, said second one and said third one of said segments independently of one another.

17. An image display system as set forth in claim 13 wherein said image producing means includes position control means for locating said respective component images of said subject on said segments independently of one another.

* * * * *